2 Sheets—Sheet 1.
J. W. HORST.
MANURE FORK.
No. 79,831. Patented July 14, 1868.
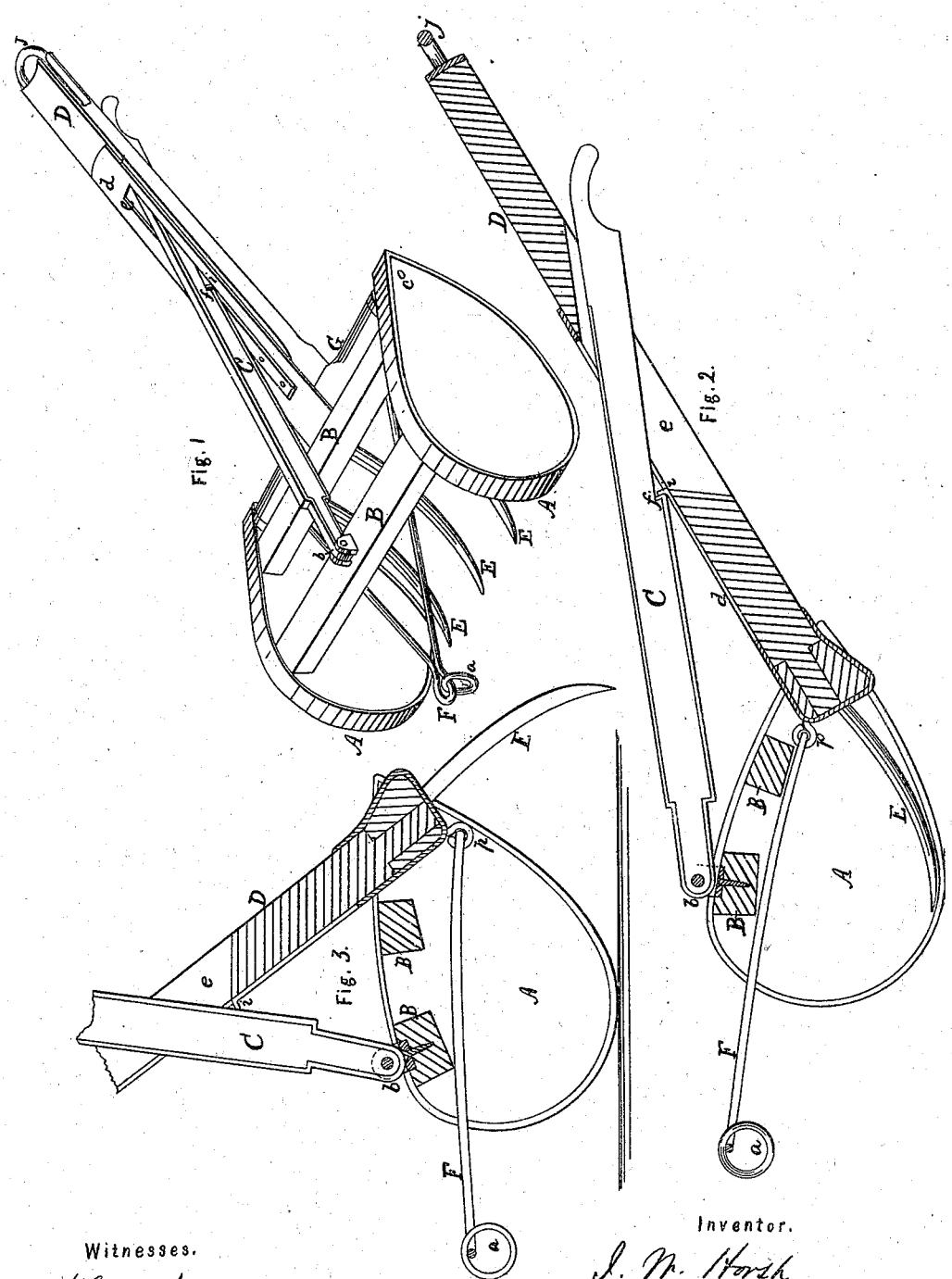
Witnesses.
J. K. Campbell
R. T. Campbell
Inventor.
J. W. Horst
by
Mason, Fenwick & Lawrence

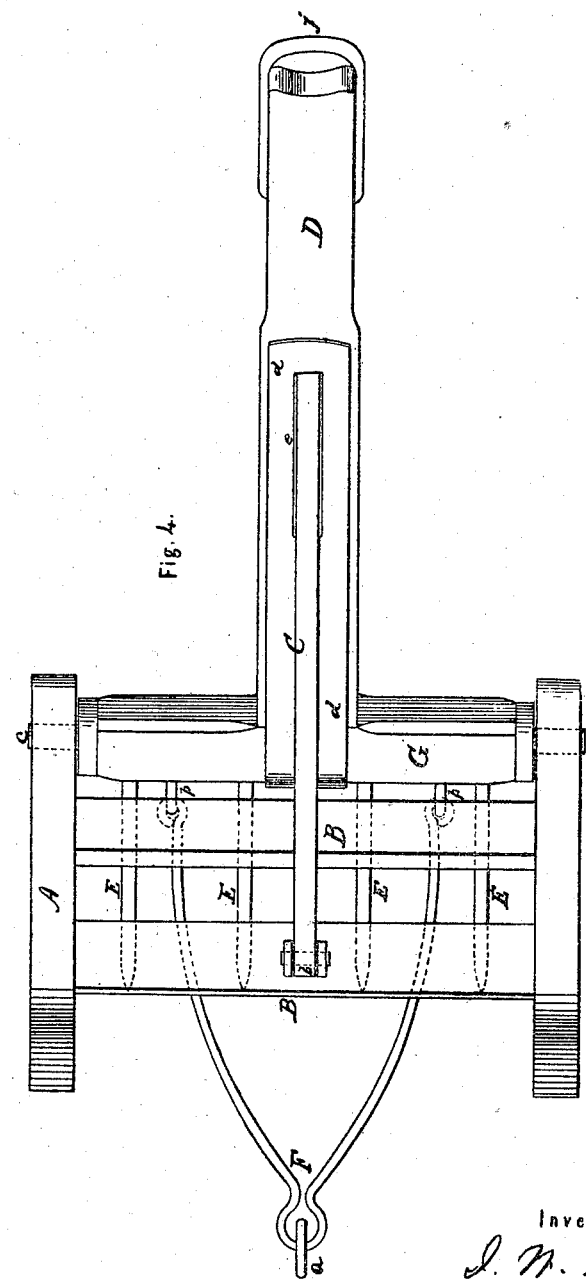

UNITED STATES PATENT OFFICE.

JACOB W. HORST, OF ANNVILLE, PENNSYLVANIA.

IMPROVEMENT IN MANURE-FORKS.

Specification forming part of Letters Patent No. 79,831, dated July 14, 1868.

*To all whom it may concern:*

Be it known that I, JACOB W. HORST, of Annville, in the county of Lebanon and State of Pennsylvania, have invented a Combined Fork and Sled; and I do hereby declare that the following is a full, clear, and exact description thereof, reference being had to the accompanying drawings, making a part of this specification, in which—

Figure 1 is a perspective view of the implement. Fig. 2 is a longitudinal section taken centrally through the implement, showing the positions the several parts would assume relatively to each other if carrying a load. Fig. 3 is a sectional view, showing the relative positions of the fork and sled-runners in the act of discharging a load. Fig. 4 is a top view of the implement.

Similar letters of reference indicate corresponding parts in the several figures.

This invention relates to improvements on implements which are designed for removing manure, chaff, and other substances from stables and barns.

It consists in a fork and sled combined and constructed in a novel manner, the fork-head being pivoted to sled-runners of an ovate form, and the runners and fork-handle being provided with means which will allow the tines to be supported above the level of the surface upon which the runners rest, and which will also allow the tines to be dropped when it is desired to discharge a load from them, as will be hereinafter explained.

To enable others skilled in the art to understand my invention, I will describe its construction and operation.

In the accompanying drawings, A A represent two sled-runners of an ovate shape, which are shod with metal bands or tires and secured at a proper distance apart by means of cross-beams B B. The runners and beams form a rocking sled or carriage for supporting a fork and allowing a load upon the fork to be transported from one place to another with facility. The fork consists of a head, G, from which curved tines E project, and to which a handle, D, is firmly secured. The head G of this fork is pivoted between the rocking runners A A, near their rear pointed ends, so that the fork can be made to assume the positions represented in Figs. 2 and 3, the first position being adapted for carrying a load and the second position for discharging a load. The tines E are curved, so that when they are held in the position shown in Fig. 2 their points will turn upward, so as not to be caught by objects in the path of the implement.

To the front beam, B, a catch-bar, C, is pivoted, which extends back and passes through an oblong slot, e, made through the handle D, and has a handle formed on its rear end, as shown in Figs. 1 and 2. This bar is constructed with a catch or shoulder, f, upon its lower edge, which, when the parts are adjusted, as shown in Figs. 1 and 2, will be brought against a hook, i, on the face-plate d of the handle D, thus holding the parts in said positions and supporting the points of the tines above the surface upon which the runners rest. By raising the bar C and freeing it from the hook i the tines will drop, and if the implement is being drawn forward they will catch into the ground and discharge the load by assuming the position shown in Fig. 3.

To the upper front corner of the fork-head G eyes $p\,p$ are secured at equal distances on each side of the center of this head, and to these eyes draft-hounds F are attached by the ring $a$, to which the animal is hitched for drawing the implement.

The mode of using the implement is as follows: The attendant grasps the handle D, and when this handle is free from the latch-bar C plunges the tines into a heap of manure or other substance to be moved. He then draws back the handle, and at the same time forces the bar C forward until the hook i catches behind the shoulders f, which operation will raise the load bodily and elevate the points of the tines E above the ground, so that they will not offer an obstruction to the implement while moving it to the place for discharging its load.

It will be seen that the ovate shape of the runners A will form rocking supports for the fork and allow the tines to be elevated high enough to clear obstructions in the path. They also afford a support for the beam B, to which the bar C is pivoted, and allow this bar and the rear bar, B, to be raised high enough to leave the necessary amount of space below them for receiving the load upon the fork and preventing the substance from scattering or escaping from the fork while being carried to the place for deposit.

Having described my invention, what I claim as new, and desire to secure by Letters Patent, is—

1. The fork D G E, pivoted to runners A A, and provided with a latching-bar, C, substantially as described.

2. The use of sled-runners A A, constructed substantially as described, and adapted for sustaining a fork, and also a latching-bar, C, which passes through the handle of the fork, substantially as set forth.

JACOB W. HORST.

Witnesses:
HENRY B. BODENHORN,
GEO. W. HOVERTER.